(12) United States Patent
Fischer

(10) Patent No.: US 8,317,141 B2
(45) Date of Patent: Nov. 27, 2012

(54) TRIPOD

(75) Inventor: Walter H. Fischer, Dornstetten (DE)

(73) Assignee: NEDO GmbH & Co. KG, Dornstetten (DE)

( * ) Notice: Subject to any disclaimer, the term of this patent is extended or adjusted under 35 U.S.C. 154(b) by 76 days.

(21) Appl. No.: 12/937,511

(22) PCT Filed: Mar. 12, 2009

(86) PCT No.: PCT/DE2009/000343
§ 371 (c)(1),
(2), (4) Date: Oct. 12, 2010

(87) PCT Pub. No.: WO2009/127180
PCT Pub. Date: Oct. 22, 2009

(65) Prior Publication Data
US 2011/0031358 A1 Feb. 10, 2011

(30) Foreign Application Priority Data
Apr. 14, 2008 (DE) .......................... 10 2008 018 761

(51) Int. Cl.
*F16M 11/38* (2006.01)
(52) U.S. Cl. ................ 248/168; 248/188.5; 248/231.85; 292/113; 396/419
(58) Field of Classification Search .................. 248/168, 248/188.5; 396/419
See application file for complete search history.

(56) References Cited

U.S. PATENT DOCUMENTS

| 1,854,248 | A | * | 4/1932 | Cairney | 248/436 |
| 2,899,164 | A |   | 8/1959 | Nicholas et al. | |
| 3,188,126 | A | * | 6/1965 | Krause | 292/11 |
| 4,290,633 | A | * | 9/1981 | Sullivan | 292/114 |
| 4,324,477 | A |   | 4/1982 | Miyazaki | |
| 4,570,886 | A | * | 2/1986 | Mooney | 248/186.1 |
| 4,872,627 | A | * | 10/1989 | O'Connor | 248/168 |
| 5,125,613 | A | * | 6/1992 | Albee et al. | 248/464 |
| 5,253,833 | A | * | 10/1993 | Indou | 248/168 |

(Continued)

FOREIGN PATENT DOCUMENTS
DE  42 32 665 A1  4/1993
(Continued)

OTHER PUBLICATIONS

NEDO Aluminium-Stative products list; retrieved from http://nedo.com/german/products/stative/alustative.html on Mar. 16, 2009 (3 pages).

(Continued)

*Primary Examiner* — Terrell McKinnon
*Assistant Examiner* — Daniel J Breslin
(74) *Attorney, Agent, or Firm* — Faegre Baker Daniels

(57) ABSTRACT

A tripod configured with three tripod legs pivotally attached to a tripod plate comprises as components a coupling device, a connecting arrangement for the non-latching engagement of two tripod legs and a locking arrangement, which has a locking piece with a latching action and which has detent elements. In this way, in a closed position the tripod legs can be connected to and detached from each other very easily.

8 Claims, 6 Drawing Sheets

U.S. PATENT DOCUMENTS

| | | | | |
|---|---|---|---|---|
| 5,287,946 | A * | 2/1994 | Mayo | 182/165 |
| 5,547,242 | A * | 8/1996 | Dukatz et al. | 296/65.03 |
| 5,570,915 | A * | 11/1996 | Asadurian | 292/242 |
| 5,704,662 | A * | 1/1998 | Kwiatkowski | 292/194 |
| 6,425,703 | B1 * | 7/2002 | McDonnell et al. | 401/34 |
| 6,488,249 | B1 * | 12/2002 | Girardi et al. | 248/429 |
| 6,631,877 | B1 * | 10/2003 | Crain et al. | 248/168 |
| 7,367,745 | B2 * | 5/2008 | Lu | 403/321 |
| 7,413,143 | B2 * | 8/2008 | Frantz et al. | 244/118.6 |
| 7,726,622 | B2 * | 6/2010 | Weder | 248/465 |
| 7,823,857 | B2 * | 11/2010 | Stengel et al. | 248/450 |
| 2005/0258317 | A1 * | 11/2005 | Weder | 248/163.1 |
| 2007/0099469 | A1 * | 5/2007 | Sorensen | 439/289 |

FOREIGN PATENT DOCUMENTS

| | | |
|---|---|---|
| DE | 102 48 572 A1 | 4/2003 |
| GB | 2 130 289 | 5/1984 |
| GB | 2 259 943 | 3/1993 |

OTHER PUBLICATIONS

International Search Report dated Jul. 24, 2009 in corresponding PCT Application No. PCT/DE2009/000343.

* cited by examiner

TRIPOD

CROSS REFERENCE TO RELATED APPLICATION

This application is a U.S. nationalized patent application of PCT/DE2009/00343, field Mar. 12, 2009, which claims priority to German Patent Application No. DE 10 2008 018 761.5, field Apr. 14, 2008, the entire disclosures of which are hereby expressly incorporated by reference herein.

FIELD OF INVENTION

The invention concerns a tripod with three tripod legs which are pivotally attached to a tripod plate and in a closed position are arranged close to one another, and which are connected with one another via a coupling device.

BACKGROUND ART

Such an apparatus is known, for example, from the Online catalogue "Stative" [Tripods] of the applicant. In the known tripod, which comprises three tripod legs, the tripod legs are pivotally attached to a tripod plate. In a closed position, the tripod legs are arranged close to one another and connected with one another at the foot region via a coupling device in the form of straps This design with a coupling device has the disadvantage that it is relatively cumbersome to handle, which is especially annoying if the tripod is used at frequently changing sites. It is also of disadvantage that a frequent use of the tripod on wet and muddy ground will inevitably get the straps dirty.

SUMMARY

The invention is based on the objective of providing a tripod of the type mentioned above that is characterized by a coupling device which is easy to handle even under rough conditions without the risk of soiling.

According to the invention, this objective is achieved by means of a tripod of the type mentioned above in that the coupling device comprises at least one connecting arrangement with a connection piece and a counterpart by means of which two adjacent tripod legs can be fixed relative to each other through a non-latching engagement of the connection piece and its counterpart. The coupling device comprises also a locking arrangement which has been designed with a locking piece that is located at a further tripod leg and is movable between a locking position and a release position. It also comprises detent elements that are located at the tripod legs adjacent to the further tripod leg and that are engaged in a rear grip with the locking piece in its locking position when the tripod legs are in a closed position. As a result, all tripod legs are retained relative to each other.

The design of the coupling device of an invention-based tripod makes it possible that, in order to assume the locking position, the tripod legs provided with the connecting arrangement can first of all be brought into a spatially fixed arrangement to each other. Then, this arrangement is moved toward the tripod leg provided with the locking piece until the locking piece engages in the detent elements. This process takes place almost automatically without requiring any additional manual steps and can be reversed by bringing the locking piece into a release position and thus releasing all tripod legs.

In an advantageous embodiment of an invention-based tripod, the locking arrangement comprises a spring which retains the locking piece in a locking position. In this way it can be guaranteed that the locking position of the tripod legs can only be released deliberately.

Advantageously, in a particular embodiment of an invention-based tripod, the connection piece is provided with a lug and the counterpart with a receiving recess for the lug of the connection piece. In this way, the mechanical connection can be easily detached.

In a practical development of the embodiment of an invention-based tripod mentioned above, the connection piece, or each connection piece, has the form of a ball head, and the counterpart, or each counterpart, has the form of a ball socket. As a result the tripod legs provided with a connecting arrangement will be self-centering in a very reliable manner.

In an embodiment of the developments mentioned above, the locking piece is designed as a flat lock bracket rotating around an axis, and the detent elements are designed as locking pins which have a head at one end radially extending beyond a shaft, with each shaft being connected to one tripod leg. This is a very reliable, low-maintenance embodiment.

Furthermore, in the last-mentioned embodiment it is practical that the lock bracket is connected to a step plate, allowing the lock bracket to be moved with the foot.

In a further practical embodiment of an invention-based tripod, the connecting arrangement and the locking arrangement are located at the foot regions of the tripod legs opposite the tripod plate. This makes it possible to use the favorable leverages in order to accomplish a mechanically relatively simple structure.

BRIEF DESCRIPTION OF THE DRAWINGS

The following description of an embodiment with reference to the figures in the drawings includes further practical embodiments and advantages of the invention. It is shown.

DESCRIPTION OF EMBODIMENTS

Figure 1:
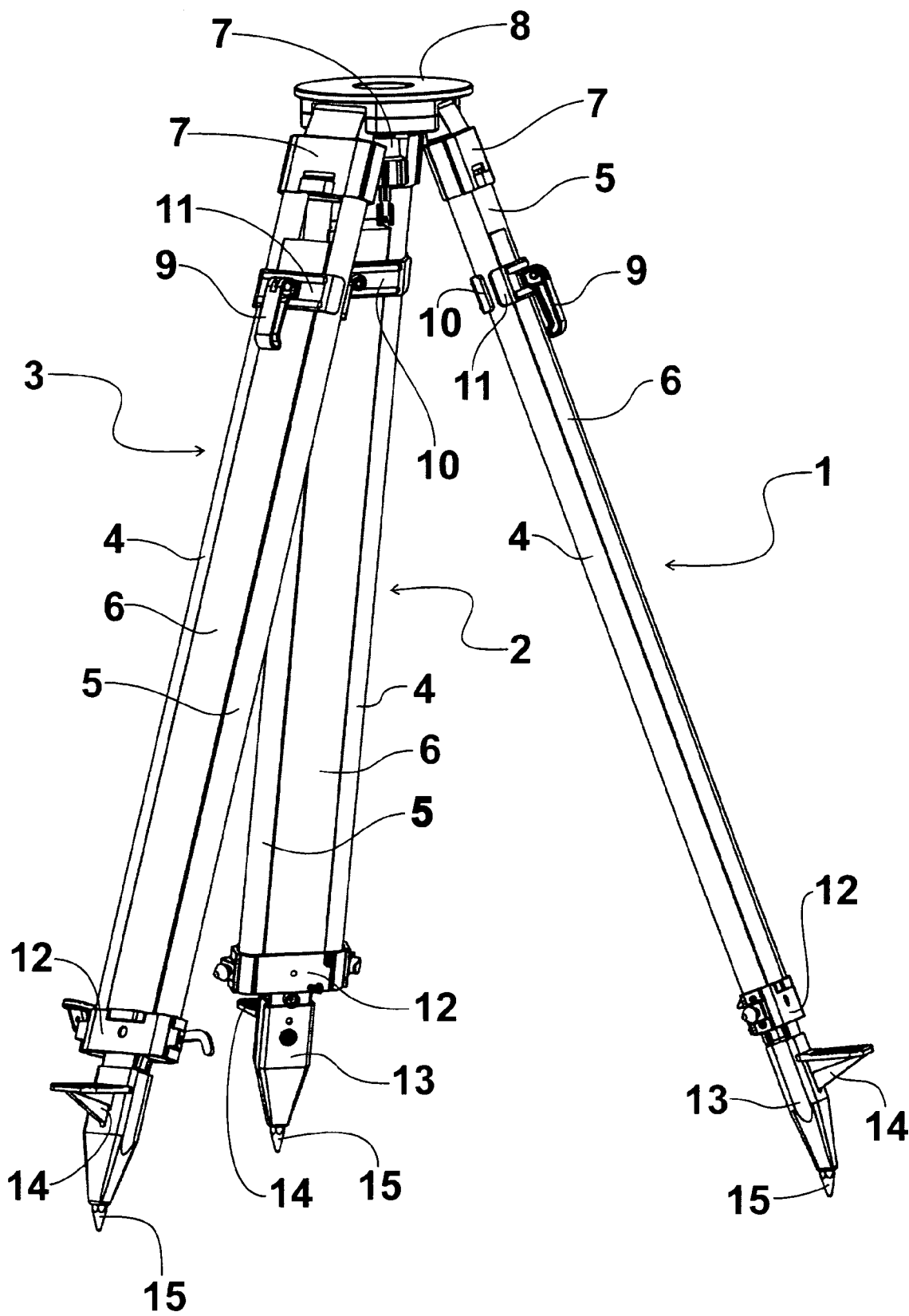
FIG. 1 a perspective view of an embodiment of an invention-based tripod, showing the three tripod legs in a standing position, FIG. 2 a perspective view of the embodiment according to FIG. 1, showing the foot region of the tripod legs, with two tripod legs brought into a spatially close arrangement to each other, and the third tripod leg still in an arrangement spaced apart from the other two tripod legs, prior to assuming a closed position.

FIG. 1 shows a perspective view of an embodiment of a tripod designed with three tripod legs 1, 2, 3. Each tripod leg 1, 2, 3 is provided on the outside with two outer spars 4, 5 between which an inner spar 6 is located that can be moved in longitudinal direction. By means of head-end outer spar mountings 7, which retain the outer spars 4, 5, each outer spar 4, 5 is pivotally attached to a tripod plate 8. At the end facing the tripod plate 8, a lock lever 9 which acts on two clamping plates 10, 11 is attached to each inner spar 6. The clamping plates 10, 11 enclose the outer spar 4, 5 adjacent to the respective inner spar 6 in order to detachably retain the respective inner spar 6 relative to the outer spars 4, 5.

At the end located opposite the head-end outer spar mounting 7, the outer spars 4, 5 are connected to one another by means of an outer spar mounting 12 at the foot end, in order to keep the head-end outer spar mounting 7 in parallel arrangement with the outer spar mounting 12 at the foot end.

At the end facing away from the lock lever 9, each inner spar 6 of a tripod leg 1, 2, 3 comprises a foot section 13 designed with a step plate 14 extending outward and with a tapered tip 15 for placement.

In FIG. 1, the tripod legs 1, 2, 3 are arranged in a standing position in which they are relatively spaced apart.

Figure 2:
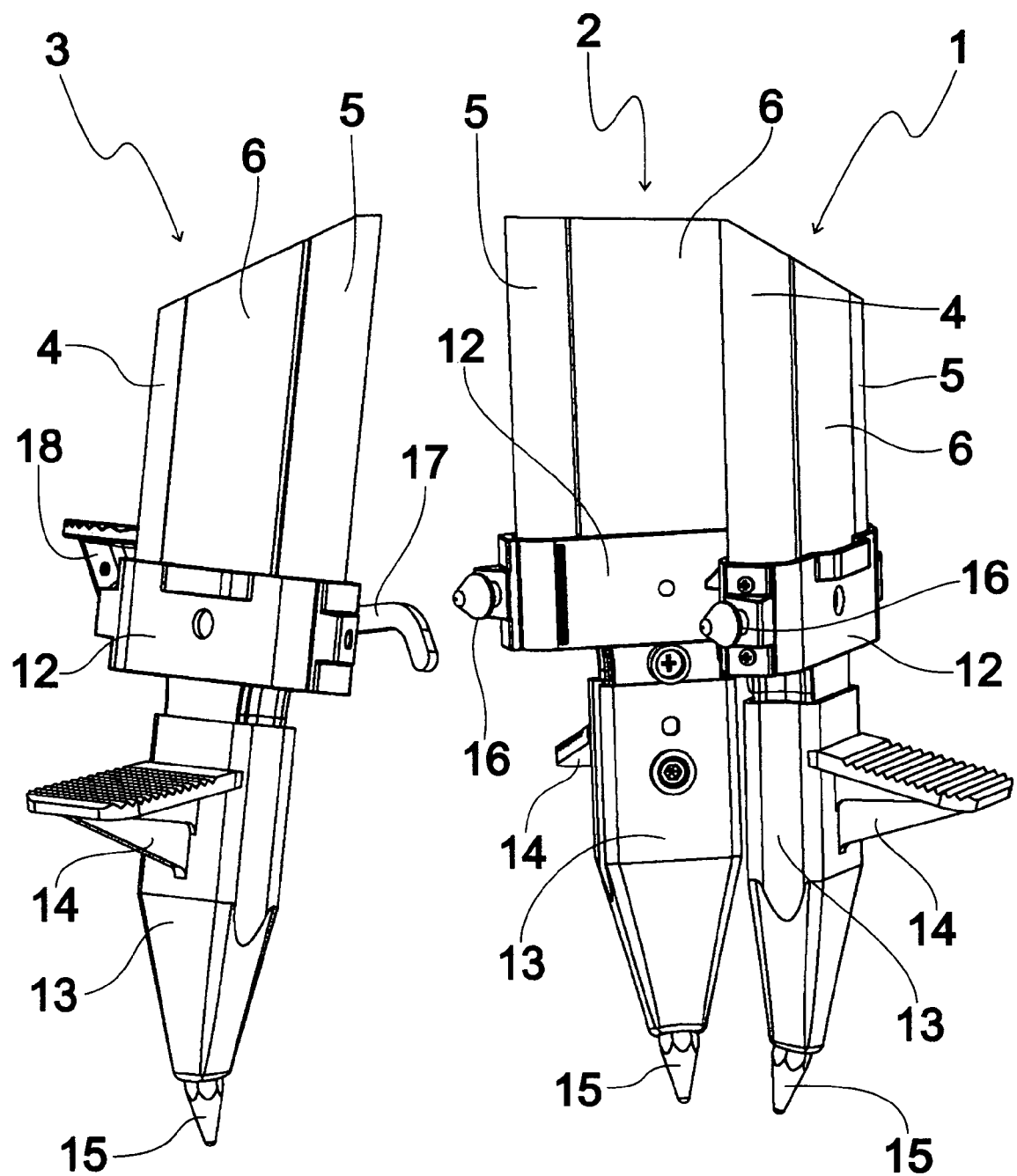

FIG. 2 shows the foot region of the tripod legs 1, 2, 3 of the embodiment of an invention-based tripod according to FIG. 1, in which the first tripod leg 1 and the second tripod leg 2 are in close arrangement for assuming a closed position, while the third tripod leg 3 is still in an arrangement spaced apart from the first tripod leg 1 and the second tripod leg 2. FIG. 2 indicates that the first tripod leg 1 and the second tripod leg 2 each comprise a locking pin 16 which functions as a detent element of a locking arrangement of a coupling device. Said locking pin 16 is attached at the foot-end side of the respective outer spar mounting 12 facing the third tripod leg 3. Furthermore, FIG. 2 shows that a lock bracket 17 functioning as a locking piece of the locking arrangement has been attached to the third tripod leg 3. Said lock bracket 17 extends in transverse direction of the third tripod leg 3 beyond the outer spars 4, 5 and is connected with one end to a step plate 18.

Figure 3:
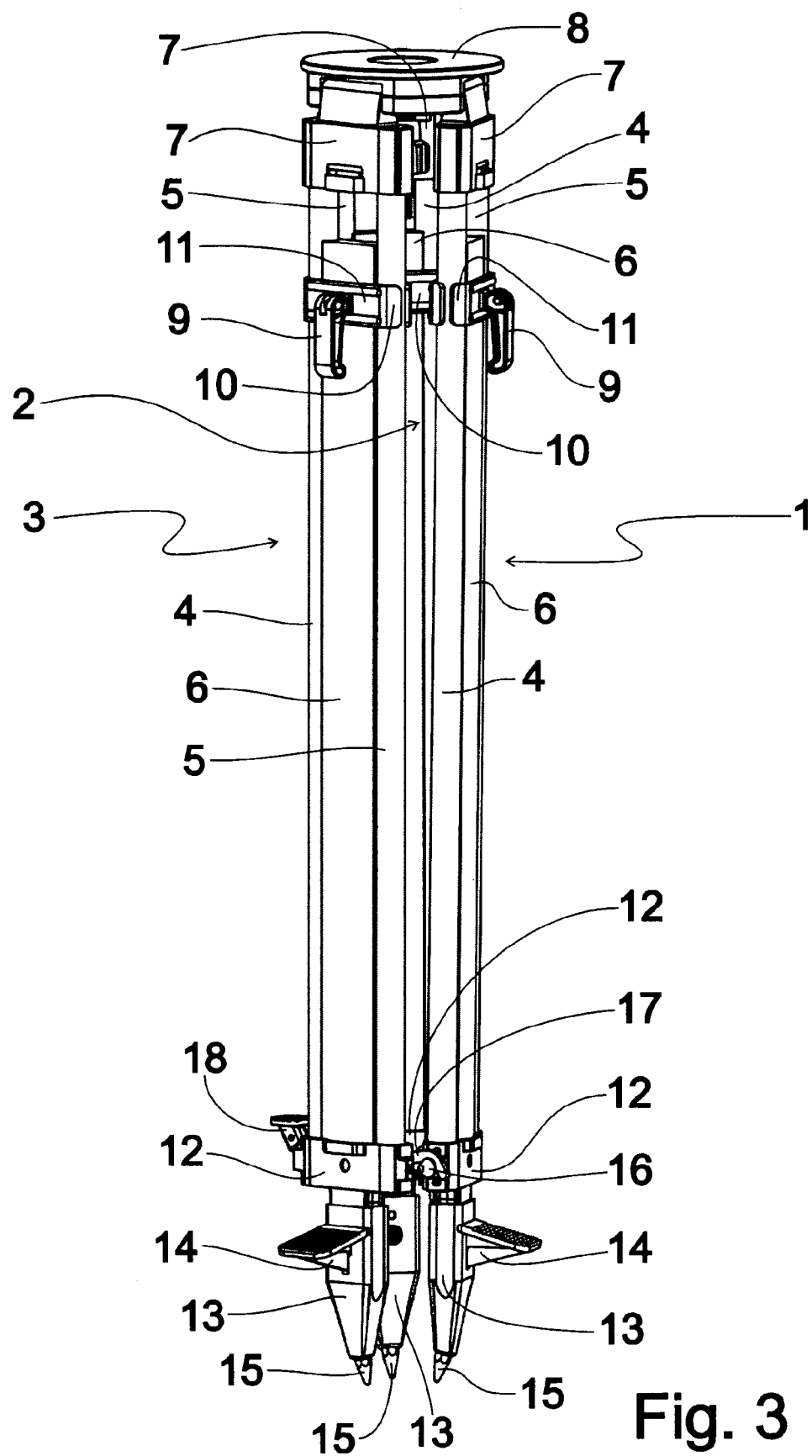
FIG. 3 a perspective view of the embodiment according to FIG. 1, showing the tripod legs in a closed position, FIG. 4 a sectional view of the embodiment according to FIG. 1, showing the tripod legs in a closed position according to FIG. 3, FIG. 5 a perspective view of the embodiment according to FIG. 1, showing the tripod legs in a closed position and a locking piece in a locking position, and FIG. 6 the embodiment according to FIG. 1, showing the locking piece in a release position.

FIG. 3 shows a perspective view of the embodiment according to FIG. 1 in which the tripod legs 1, 2, 3 are in a closed position, all arranged close to one another. FIG. 3 indicates that, when the tripod legs 1, 2, 3 are in a closed position, the lock bracket 17 engages behind the locking pins 16, thus connecting the tripod legs 1, 2, 3.

Figure 4:
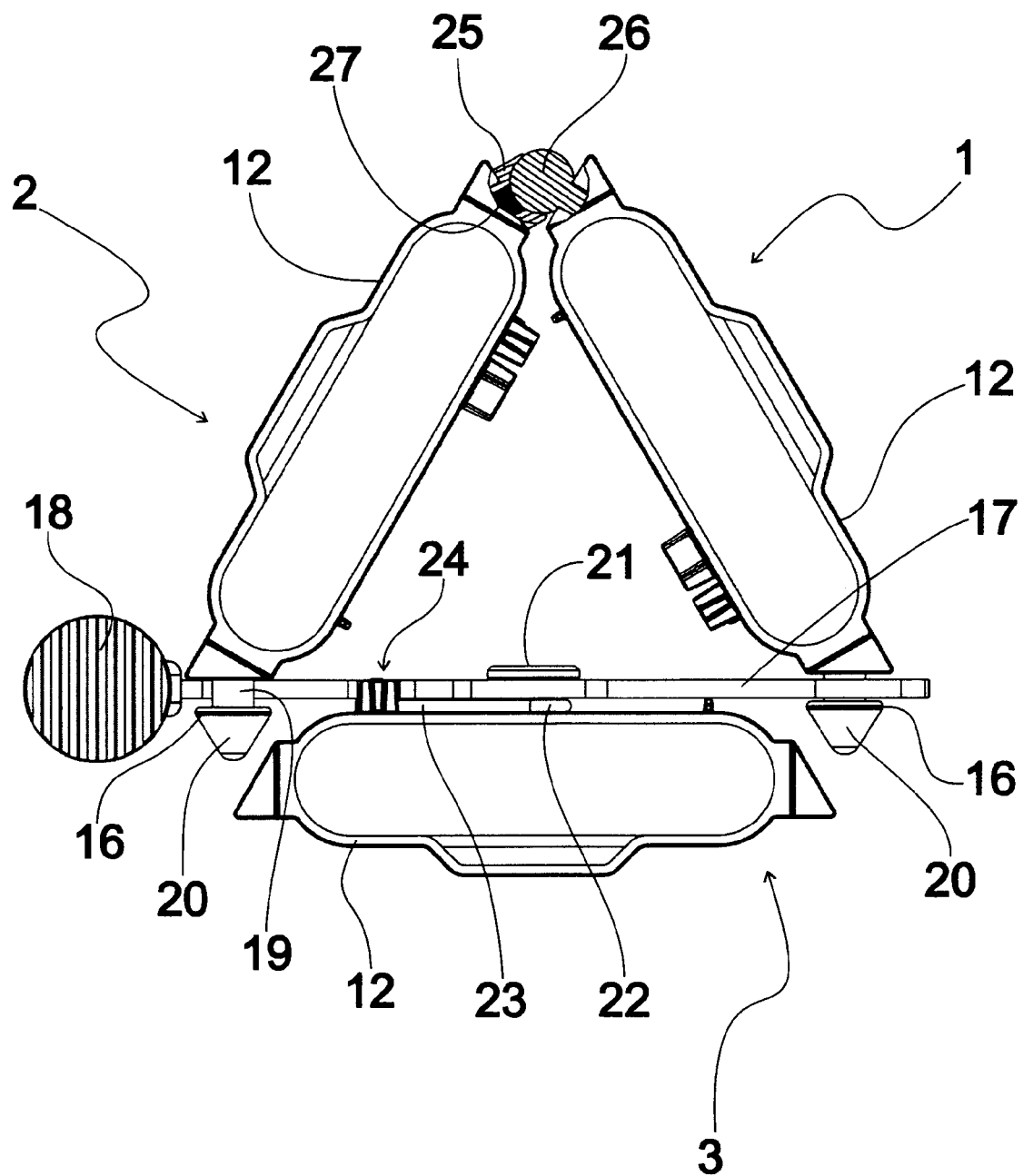

FIG. 4 shows a sectional view of the embodiment according to FIG. 1 in which the tripod legs 1, 2, 3 are in a closed position. FIG. 4 indicates that each locking pin 16 is attached by means of shaft 19 with the outer spar mounting 12 at the foot end, and that each locking pin 16 is provided with a head 20 that is radially extending beyond a shaft 19. In the locking position, the lock bracket 17 engages with said head 20. By way of an axis, 21, the lock bracket 17 is pivotally attached to the outer spar mounting 12 at the foot-end side and is kept in a closed position by means of a spring which is fixed with its one end around the axis 21 and which engages with a spring arm 23 at a limit stop 24 designed at the lock bracket 17.

Furthermore, FIG. 4 shows that the coupling device has also been designed with a connecting arrangement provided at the first tripod leg 1 and the second tripod leg 2. Said connecting arrangement has a ball socket 25 functioning as a counterpart, which is located (in this embodiment) at the first tripod leg 1 and a ball head 26 functioning as a connection piece, which is connected (in this embodiment) at the second tripod leg 2. When the first tripod leg 1 and the second tripod leg 2 are in spatially close arrangement to each other, the ball socket 25 and the ball head 26 come into a self-centering non-latching engagement with one, thus fixing relative to each other the first tripod leg 1 and the second tripod leg 2. As a result of this loose engagement, the first tripod leg 1 and the second tripod leg 2 come into a prefixed condition, and the pressure of the third tripod leg 3 will prevent the first tripod leg 1 and the second tripod leg 2 from slipping out of the lock bracket, thus assuming the closed position.

Furthermore, FIG. 4 shows that the coupling device comprises a magnet arrangement, here in the form of permanent magnets 27, which are integrated in the ball socket 25 shielded from mechanical influences, and which have a magnetic effect on the ball head 26 consisting completely of ferromagnetic material. Thus, the ball socket 25 and the ball head 26 are coupled in magnetic manner, improving the self-centering effect.

Figure 5:
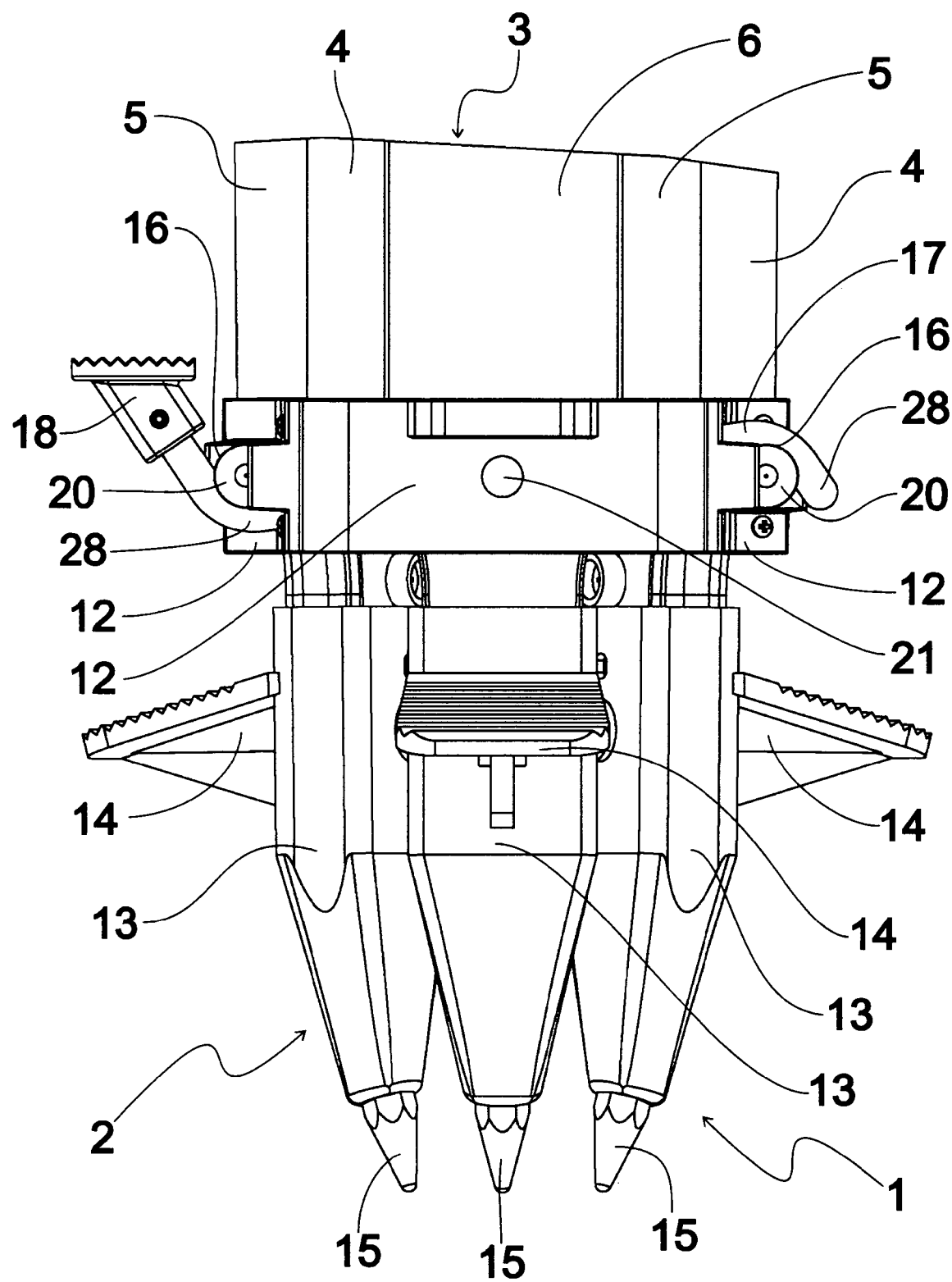

FIG. 5 shows a lateral view of the foot region of the embodiment according to FIG. 1 in which the tripod legs 1, 2, 3 are in a closed position. FIG. 5 indicates that, in the locking position of the lock bracket 17 designed with bent-over ends 28, the heads 20 of the locking pins 16 have a relatively large circumferential section for a rear grip which guarantees that the three tripod legs are securely locked with each other.

Figure 6:
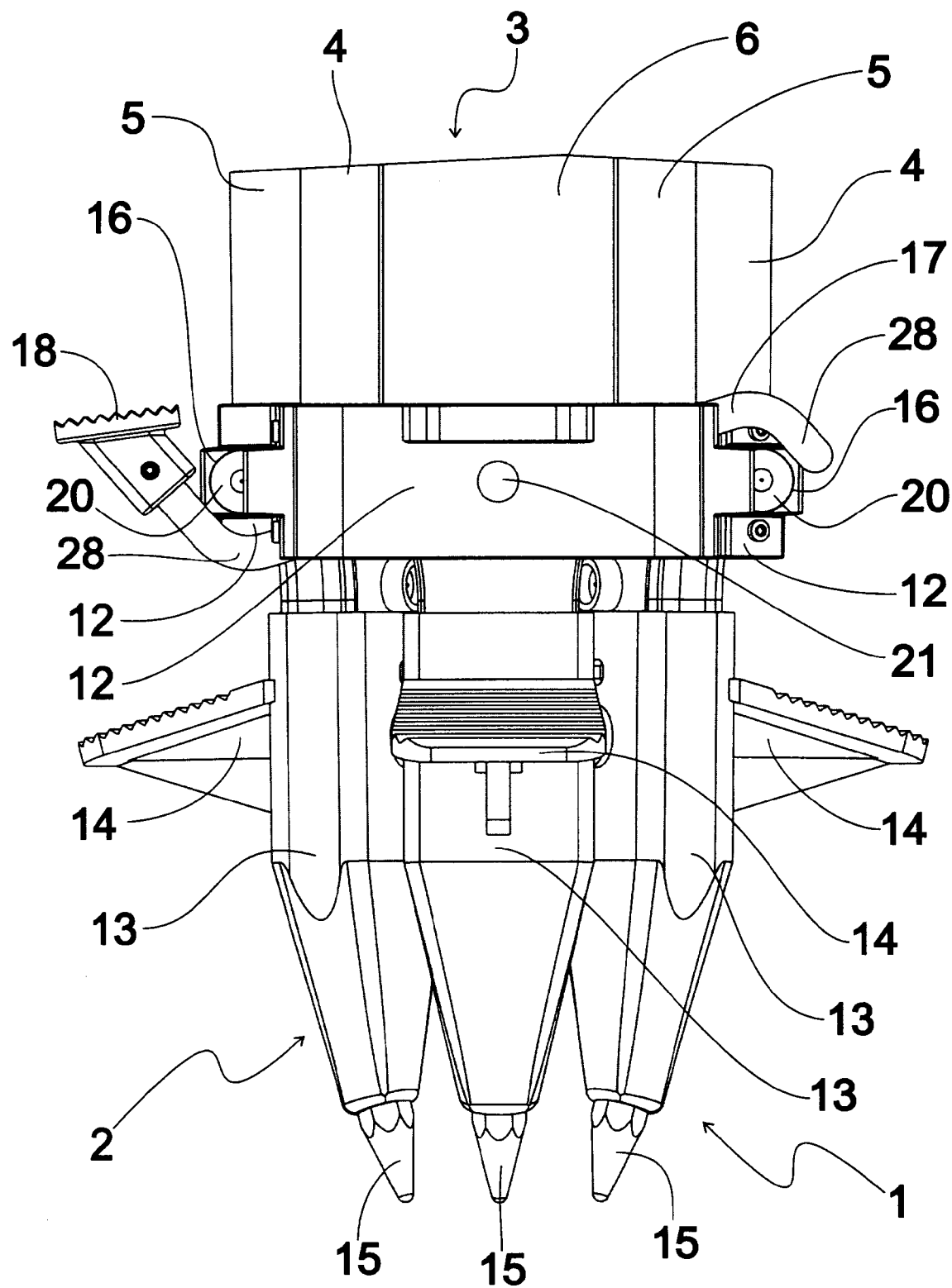

FIG. 6 shows the embodiment of an invention-based tripod according to FIG. 1 in which the lock bracket 17 has assumed a release position because stepping on the step plate 18 has put the spring 22 under pressure. In said release position, the rear grip of the bent-over ends 27 of the lock bracket 17 and the heads 20 of the locking pins are detached so that the tripod legs 1, 2, 3 can now be transferred again in reversible manner from the locking position according to FIG. 3 into the standing position according to FIG. 1.

The invention claimed is:

1. A tripod with first, second, and third tripod legs which are pivotally attached to a tripod plate and in a closed position are arranged close to one another, and which are connectable to one another via a coupling device, wherein said coupling device comprises:
   a. at least one connecting arrangement with a connection piece and a counterpart by means of which the first and second tripod legs can be connected relative to each other through a self-centering engagement of the connection piece and its counterpart; and,
   b. a locking arrangement which has been designed with a locking piece that is located at the third tripod leg and is movable between a locking position and a release position and detent elements that are located at the first and second tripod legs and that are engaged with the locking piece in its locking position when the first, second, and third tripod legs are in a closed position, thus fixing all tripod legs relative to each other, wherein the locking piece is flat lock bracket rotatable around an axis, and the detent elements are locking pins which have a head at one end radially extending beyond a shaft, said shafts respectively connected to said first and second tripod legs.

2. A tripod according to claim 1, wherein the locking arrangement comprises a spring which keeps the locking piece in the locking position.

3. A tripod according to claim 1, wherein the lock bracket is connected with a step plate.

4. A tripod according to claim 1, wherein the connecting arrangement and the locking arrangement are disposed at foot regions of the tripod legs opposite the tripod plate.

5. A tripod according to claim 1, wherein the connection piece comprises a head and the counterpart comprises a socket for receiving the head of the connection piece.

6. A tripod according to claim 5, wherein each said head is a ball head, and each said socket is a ball socket.

7. A tripod according to claim 1, wherein the coupling device comprises a magnet arrangement with the connection piece coupling in magnetic manner with the counterpart.

8. A tripod according to claim 7, wherein the magnet arrangement comprises at least one permanent magnet with each permanent magnet arranged in the counterpart, and the connection piece has ferromagnetic characteristics.

* * * * *